(12) United States Patent
Berntsen et al.

(10) Patent No.: US 7,778,923 B2
(45) Date of Patent: Aug. 17, 2010

(54) METHOD, SYSTEM AND APPARATUS FOR INCREASING THE DEPOSIT-BASED ASSETS OF BANKING INSTITUTIONS SUBJECT TO FRACTIONAL-RESERVE BANKING

(75) Inventors: William O. Berntsen, Whitehouse Station, NJ (US); Laurence P. Casey, Annandale, NJ (US)

(73) Assignee: Thea Financial Services, Ltd., Whitehouse Station, NJ (US)

( * ) Notice: Subject to any disclaimer, the term of this patent is extended or adjusted under 35 U.S.C. 154(b) by 151 days.

(21) Appl. No.: 11/789,260

(22) Filed: Apr. 24, 2007

(65) Prior Publication Data

US 2008/0097900 A1    Apr. 24, 2008

Related U.S. Application Data

(60) Provisional application No. 60/853,866, filed on Oct. 24, 2006.

(51) Int. Cl.
*G06Q 40/00* (2006.01)
*G06Q 20/00* (2006.01)
*G06F 3/033* (2006.01)

(52) U.S. Cl. .............................. 705/42; 705/39; 705/44; 705/66; 235/379; 345/179

(58) Field of Classification Search ................. 235/379; 345/179; 705/39, 42, 44, 64, 66, 35; 709/229
See application file for complete search history.

(56) References Cited

U.S. PATENT DOCUMENTS

| | | | | |
|---|---|---|---|---|
| 5,671,364 | A * | 9/1997 | Turk | 705/39 |
| 5,920,848 | A * | 7/1999 | Schutzer et al. | 705/42 |
| 5,949,880 | A * | 9/1999 | Curry et al. | 705/66 |
| 6,202,054 | B1 * | 3/2001 | Lawlor et al. | 705/42 |
| 6,311,171 | B1 * | 10/2001 | Dent | 705/64 |
| 6,536,663 | B1 * | 3/2003 | Lozier et al. | 235/379 |

(Continued)

OTHER PUBLICATIONS

Murray N. Rothbard, Fractional Reserve Banking: Part II, Oct. 1995, The Freeman, vol. 45, Issue 10, pp. 1-7.*

(Continued)

*Primary Examiner*—James P Trammell
*Assistant Examiner*—B. Joan Amelunxen
(74) *Attorney, Agent, or Firm*—Stein Law, P.C.; Mitchell A. Stein, Esq.; Erik B. Zarkowsky, Esq.

(57) ABSTRACT

A method for increasing the demand deposit asset base of a bank for fractional-reserve banking within the Federal Reserve System, with first and second demand deposit accounts captive at that bank, comprising: (a) receiving physical fractional currency at the bank and increasing the first account balance in an amount corresponding to the value of currency received; (b) encrypting in a "cre-bit" device the balance of the first account including the numeric value of currency received; (c) reflecting in a node device currency amounts concomitantly linked to the second account; (d) performing a commercial transaction without the use of physical functional currency for a specific amount such that the first account is simultaneously debited and the second account is credited the specific amount; (e) repeating step (a) then step (b) and/or repeating step (c); and (f) displaying the first account balance and "cre-bit" data on the "cre-bit" device.

15 Claims, 9 Drawing Sheets

U.S. PATENT DOCUMENTS

| | | | |
|---|---|---|---|
| 6,956,564 B1 * | 10/2005 | Williams | 345/179 |
| 7,319,987 B1 * | 1/2008 | Hoffman et al. | 705/44 |
| 7,389,355 B2 * | 6/2008 | Brown et al. | 709/229 |
| 2002/0038289 A1 * | 3/2002 | Lawlor et al. | 705/42 |
| 2003/0172027 A1 * | 9/2003 | Scott | 705/39 |
| 2003/0191708 A1 * | 10/2003 | Turk | 705/39 |
| 2005/0154670 A1 * | 7/2005 | Heitz et al. | 705/39 |
| 2007/0118449 A1 * | 5/2007 | De La Motte | 705/35 |

OTHER PUBLICATIONS

Murray N. Rothbard, Fractional Banking: Part II, The Freeman, vol. 45, Issue 10, Oct. 1995.*

* cited by examiner (Portable Device)

(Node Device)

(Exploded Side View of Portable Device)

(Exploded Back View of Portable Device)

(Bottom View of Portable Device)

(Side View of Portable Device)

(Front View of Portable Device)

METHOD, SYSTEM AND APPARATUS FOR INCREASING THE DEPOSIT-BASED ASSETS OF BANKING INSTITUTIONS SUBJECT TO FRACTIONAL-RESERVE BANKING

CONTINUING DATA/CROSS-REFERENCE TO RELATED PROVISIONAL

This application claims the benefit of the common subject matter, content and earlier filing date of U.S. Provisional Application No. 60/853,866, dated Oct. 24, 2006, pursuant to 35 U.S.C. §119(e).

FIELD OF THE INVENTION

The present invention relates to the field of methods, systems and apparatus for use in banking, and more specifically to electronic methods, systems and devices for increasing banking reserves and fractional-reserve banking preferably by capturing metallic coinage currency.

BACKGROUND OF THE INVENTION

In the course of any given day, consumers utilize a composite of mechanisms to perform financial transactions. In particular, credit cards, debit cards, and cash are employed. Yet, it is habitual to such consumers that despite the availability of card-based options, cash (i.e., paper and coinage) remains a primary vehicle for financial transactions. Daily, consumers withdraw cash or receive cash for purchases, whether the purchase is major or incidental.

Yet, as a result of historical underpinnings to such transactions (tax predominantly), the amounts of money involved in such commercial transactions rarely result in whole numbers, but rather include fractions of a dollar. Nor are such transactions rounded to the nearest paper value (like a dollar, for instance), as the perception of the consumer defies such an outcome. With pricing and taxing, the net sum for transactions is therefore rendered in fractions of a dollar.

In virtually every commercial scenario, there is a residual, fractional portion of at least a dollar remaining from such transactions. In cash transactions, fractional metallic currency is inevitably received as coinage. Thereupon, the consumer must face the requirement of handling coinage and determining the best mechanism to utilize the same. Perhaps as a result of the bulk in carrying coinage about, or its perceived limited value (in comparison to paper money), or some other factor that renders the same a nuisance, carrying coinage is short term. The consumer generally seeks to disband the same.

One mechanism of disbanding of coinage is, e.g., a compulsory tip. In this manner, at the point of sale ("POS"), a consumer may simply say "keep the change" or present the change. While styled as a gracious gesture, the harsh reality is that the consumer would rather give away what appears to be trivial than face the nuisance associated with carrying the same. Of course, mathematically, calculating for that consumer the amount of money lost by avoiding the nuisance of change amounts to non-trivial amounts over time. Yet, this is but one option to avoid the necessity to handle metallic currency and determine where to place the same, or to carry the same.

Historically, the use of a "piggy bank" was predominately invoked as a curious form of non-institutional savings account (for which no interest is received). As the name connotes, the "piggy bank" was principally used by children as a means to teach conceptual savings and the individual valuations of the denominations of fractional metallic currency. Of course, such use for teaching is no longer necessary, as imitation "play" money is available, and children are trained to understand the fractional differences in currency quite rapidly. Thus, the juvenile teaching aspect of fractional metallic currency has truly become a relic of past memory, and not of present interest.

Moreover, as a result of the perceived substantial dissimilarity in value of individual coins (in comparison to large tranches of higher valued paper dollars), the perceived inconvenience of bulky currency has resulted in adults—not children—literally dumping their pockets at days end into containers (baskets, buckets, jars and the like), rarely to be seen or used by anyone again. All too often, jars are filled with coinage not because the consumer wishes a non-interest bearing savings account, but rather because the consumer wishes not to have the need to carry the bulk of coinage about. Industries have arisen that provide, for example, the ability—for a fee—to take such heavy and bulky containers filled with coinage to a location where the coinage is automatically sorted and paper currency (or chits) provided for conversion. Banks will accept coinage, but except for a rare few charge the customer for presenting the same. Even banks, as discussed in greater detail below, view coinage as a nuisance (while missing the point, pivotal to the subject invention, of the actual quantity of fractional metallic currency in circulation). Considering the heft of the containers and a cost for the transaction, one might determine that all those storage containers are not really worth the effort. Nonetheless, other than simply overtipping by the consumer in a transaction to avoid the receipt of fractional metallic currency (coinage) or simply giving the same away, of necessity the consumer will receive such heft, and routinely store it in some portion of the consumer's living space generally to be ignored for the future.

Antithetically, a number of devices still require the use of coinage for operation. For example, while "dropping a dime" in a telephone for a call has since changed in price, the concept of using coinage remains the same. Vending machines for the purchase of consumables or other items still require the sue of coinage. Passive vending machines, like parking meters, tolls, admissions rights, municipal and private transit (trains, subways, buses, taxis and the like) all require some fraction of a dollar ("fractional currency") which generally amounts to coinage. (Some "smart" vending machines permit the use of debit or credit cards, but the technical interface is difficult to humanize, and market entry has been limited. Hard currency still remains the predominant form for the same.)

Despite the fact that consumers routinely engage such vending devices during the course of any given day, based upon the habitual desire to avoid the perceived nuisance of change (generally heft, ringing in the pockets, and other forms of consumer concern), rather than having change handy, the consumer who faces such devices must now scurry to a vendor not for a purchase, but to provide coinage—change on the dollar. This, of course, creates a never-ending burden on, for example, a street vendor proximate to an array of parking meters, to keep a stock pile of coins for swapping for dollars—of zero net sum gain—or, in the alternative, to almost rudely deny the desperate requester who has parked and is racing to avoid the ticket.

No matter the scenario, rarely does a day end with cash transactions "zeroing" out. Rather, the end result is that the consumer who initiates the day with no coinage (having dumped the change from the prior day in the family bin to avoid inconvenience) now completes the day with more coinage, which, in turn hits the same family bin. The situation escalates, in typical fashion. Rarely does the consumer actually prepare for the event, but rather, disturbingly, must face coinage at the time of the occurrence. Interestingly, despite the fact that the result of a failure to pay for, by way of example, a parking meter, results in a multiple dollar fine—which is in whole dollars and is typically paid by a mailed in check—such sanction is avoided only upon the necessity of the moment. As a result of the inherent nuisance of change, many a consumer will avoid the necessity for change-related behavior, or face the urgency of the moment if it occurs.

As shown by the foregoing, it has become known that consumers receive more coinage then they actually place back into commerce. For a further example, at the "register" in stores for typical commercial transactions, it should be noted that generally coinage is given away. Reportedly, many retail stores (supermarkets, for example) have daily (and at times more frequently) delivery of coinage in all denominations. Such stores must track the rate of depletion of the plurality of forms of fractional metallic currency in order to predict the needs and avoid the confusion of having too much of one form of coinage and not enough of another. While paper currency leaves such stores in armored trucks to be transferred to a banking institution, coinage is actually routinely delivered to such retail stores as the paper is extracted. The need to provide fractional currency in commercial transactions—which is heretofore solely in the form of coinage—is a constant, nagging occurrence to many retail establishments.

While governments can (and do) repatriate paper currency in large and successful manners for a host of necessary reasons, the same cannot be said of fractional metallic currency. Observably, consumers "hoard" coinage not because they are numismatists (coin collectors, of which there are many but the total amount of money involved is small) but because they simply wish to avoid the nuisance associated therewith. Simply put, paper is lighter and worth more. Yet, the Department of the Treasury reported that the total value of all fractional metallic currency in circulation is approximately a staggering $33.3 billion dollars, growing at a rate of about $900 million annually. Thus, the accumulation of coinage in total numbers is remarkable. Indeed, the sum total value of all paper currency in the form of $1, $5, and $10 bills in circulation is less than the value of metallic currency. Considering the disparate value between paper and coinage, the sheer bulk of such coinage is overwhelming, and the value staggering, heretofore beyond the control of the banking institutions.

It is thus an object of the instant invention to provide a system, method and devices that enable the minimization to elimination of fractional metallic currency from transactions without forfeiture of the underlying value. Likewise, it is a further object of the instant invention to provide a platform for which not just metallic currency is eliminated, although that is presently preferred, but likewise all currency can be eliminated in the future.

In order to understand the subtlety of the instant invention, it is necessary to understand money, banking, and the concept of "fractional-reserve banking."

Arguably, money was perhaps the most important advancement as a platform for human development and exchange of products and services. Money has been independently utilized at one time or another in each important civilization in the history of the world. There is also a remarkable similarity in the process by which money has evolved in different times in history and in different parts of the world.

Historically, money has typically evolved through three stages. In the first stage, money is comprised of a rare and inherently valuable material. The value of each denomination is related to the quantity of rare material contained therein. In the second stage, money is made of another material, such as paper, with no inherent value. In this stage, however, such other material can be exchanged into the rare material upon demand. In the third and final stage, money cannot be exchanged into anything physical, but its value is determined by law and custom.

Physical money has historically arisen as a means to facilitate trade. In most cases some form of metallic money has been used, but there are also other examples, where shells, or even large stones (on an isolated island) have been used as money. Oil was proposed as form of currency by the great Soros (and indeed is, at some level, used as a currency in and of itself). Gold and silver have predominated in the world as intrinsically valuable rare materials that can be easily rendered into denominations (contained pictures or other images of origin or pictorial images), but other metals have occasionally also been used. Bronze was the basis of the monetary system in early Roman times. Copper has also been used at times, for example in Spain and Sweden. In many cases, combinations have been used, with fixed exchange rates between different metals. Those fixed exchange rates have usually broken down as the relative value of the metals has moved due to changes in supply or demand.

Coins are the basis of almost every metallic monetary system. A coin in a physical money system is a piece of metal with a stamp. The stamp is a guarantee that the metallic weight and content is correct. Likewise, it is a mechanism to standardized coins of the same denomination as actually being of the same weight, caliber and value. While metallic coinage may appear trivial in the current climate, quality was historically important. Previously, metals had to be weighed in order to determine value, and that made trade more difficult.

In the United States, the third stage indicated above—where paper currency is no longer backed by the value of the underlying rare material—occurred as a result of the abolition of the gold standard by President Franklin Roosevelt in 1933. At this point was born the substitution of fiat paper tickets by the Federal Reserve as the United States' "monetary standard." Some thirty years later, the fractional metallic currency (coinage) followed suit, with the substitution of alloys for the traditional intrinsically valuable copper, silver and nickel originally used as the coinage material. Another crucial part of this process was the federal cartelization of the nation's banks through the creation of the Federal Reserve System in 1913.

Banking is a particularly arcane part of the economic system; one of the problems is that the word "bank" covers many different activities, with very different implications. During the Renaissance era, the Medicis in Italy and the Fuggers in Germany, were "bankers," their banking, however, was not only private but also began at least as a legitimate, non-inflationary, and highly productive activity. Essentially, these were "merchant-bankers," who started as prominent merchants. In the course of their trade, the merchants began to extend credit to their customers, and in the case of these great banking families, the credit or "banking" part of their operations eventually overshadowed their mercantile activities. These firms lent money out of their own profits and savings, and earned interest from the loans. Hence, they were channels for the productive investment of their own savings.

To the extent that banks lend their own savings, or mobilize the savings of others, their activities are productive and unexceptionable. Even in our current commercial banking system, if a customer purchases a $10,000 CD ("certificate of deposit") redeemable in six months, earning a certain fixed interest return, that customer is actually taking savings and lending it to the bank (in exchange for the CD which is an "IOU"). The bank, in turn lends upon the money actually received in exchange for the CD at an interest rate higher than that being paid to the customer who purchased the CD. The difference between the higher rate to the debtor who received the loan, and the lower rate to the CD-holder who placed the cash, constitutes bank's earnings. Indeed, in this manner, the bank has served the function of channeling savings into the hands of credit-worthy or productive borrowers.

The same is even true of the great "investment banking" houses, which developed as industrial capitalism flowered in the nineteenth century. Investment bankers would take their own capital, or capital invested or loaned by others, to underwrite corporations gathering capital by selling securities to stockholders and creditors. The problem with the investment bankers is that one of their major fields of investment was the underwriting of government bonds, which plunged them hip-deep into politics, giving them a powerful incentive for pressuring and manipulating governments, so that taxes would be levied to pay off their and their clients' government bonds. Hence, the powerful and baleful political influence of investment bankers in the nineteenth and twentieth centuries: in particular, the Rothschilds in Western Europe, and Jay Cooke and the House of Morgan in the United States.

By the late nineteenth century, the Morgans took the lead in trying to pressure the U.S. government to cartelize industries they were interested in—first railroads and then manufacturing: to protect these industries from the winds of free competition, and to use the power of government to enable these industries to restrict production and raise prices.

In particular, the investment bankers acted as a ginger group to work for the cartelization of commercial banks. To some extent, commercial bankers lend out their own capital and money acquired by CDs. But most commercial banking is "deposit banking" based upon a perception, which most depositors believe, that their money is "down at the bank," ready to be redeemed in cash at any time. For example, if person X has a checking account of $1,000 at a local bank, X knows that this is a "demand deposit," i.e., that the bank pledges to pay him $1,000 in cash, on demand, anytime he wishes to "get his money out." Naturally, the X's are convinced that their money is safely there, in the bank, for them to take out at any time. Hence, they think of their checking account as equivalent to a warehouse receipt. (If one puts a chair in a warehouse before going on a trip, one expects to get the chair back whenever one presents the receipt.) Unfortunately, while banks depend on the warehouse perception, the fact is far more complicated. Indeed, the money is not actually there at the warehouse.

An honest warehouse makes sure that the goods entrusted to its care are there, in its storeroom or vault. Deposit banks as the Banks of Amsterdam and Hamburg in the seventeenth century indeed acted as warehouses and backed all of their receipts fully by the assets deposited, e.g., gold and silver. This honest deposit or "giro" banking is called "100 percent reserve" banking. Ever since, banks have habitually created warehouse receipts (originally bank notes and now deposits) less than 100 percent, out of a carefully constructed fractional-reserve banking, meaning that bank deposits are backed by only a small fraction of the cash they promise to have at hand and redeem. Currently, in the United States, this minimum fraction is fixed by the Federal Reserve System annually. Presently and historically this level has been at 10 percent.

To understand fractional-reserve banking in the absence of a central bank, an example can be shown. "Y" invest $1,000 of cash in a bank 1. This amount is thus captive in the bank 1 subject to the terms of the investment. It pays out at a rate. This bank 1 then lends $10,000 to "W," either for consumer spending or to invest in his business. The question arises: how can a bank lend more than it has received? The answer resides in the "fraction" in the fractional-reserve system. The bank simply opens a checking account of $10,000 for W. Why does W borrow from the bank? Well, for one thing, the bank charges a lower rate of interest than Y would have. Since demand deposits at the bank function as equivalent to cash, the nation's money supply has just increased by $10,000.

Now, W spends the money he borrowed. Sooner or later, the money he spends, whether for a vacation, or for expanding his business, will be spent on the goods or services of clients of another bank 2. Bank 2 receives a check from bank 1 and applies the same to demand cash (captive) so that it can utilize the same for fractional-reserve lending. Yet, if bank 1 defaults, the system could collapse.

Hence, under free competition, without government support and enforcement, there will only be limited scope for fractional-reserve banking. Banks could form cartels to prop each other up, but generally cartels on the market fail without government enforcement, without the government cracking down on competitors who insist on busting the cartel, in this case, forcing competing banks to pay up.

Hence historically there was a drive by bankers to compel the government to cartelize their industry by means of a Central Bank. Central Banking began with the Bank of England in the 1690s, spread to the rest of the Western world in the eighteenth and nineteenth centuries, and finally was imposed upon the United States by banking cartelists via the Federal Reserve System of 1913. Particularly enthusiastic about the Central Bank were the investment bankers, such as the Morgans, who pioneered the cartel idea, and who by this time had expanded into commercial banking.

In modern central banking, the Central Bank is granted the monopoly of the issue of bank notes (originally written or printed warehouse receipts as opposed to the intangible receipts of bank deposits), which are now identical to the government's paper money and therefore the monetary "standard" in the country. People want to use physical cash as well as bank deposits. If, therefore, if X seeks to redeem $1,000 in cash from his checking bank, the bank draws down its own checking account with the Federal Reserve Bank (the "Fed"), effectively "buying" $1,000 of Federal Reserve Notes (the cash in the United States today) from the Fed. The Fed, in other words, acts as a bankers' bank. Banks keep checking deposits at the Fed and these deposits constitute their reserves, on which they can and do perform fractional-reserve banking at the average leverage of 10 to 1.

For further example, if the Fed determines that it is advisable to expand (i.e., inflate) the money supply, the Fed goes into the market (called the "open market") and purchases an asset. It doesn't really matter what asset it buys; the important point is that it writes out a check. The Fed could, if it wanted to, buy any asset it wished, including corporate stocks, buildings, or foreign currency. In practice, the Fed routinely acquires U.S. government securities.

Let's assume that the Fed buys $10,000,000 of U.S. Treasury bills from some "approved" government bond dealer (a small group), say Investment Banker on Wall Street. The Fed writes out a check for $10,000,000, which it gives to Investment Banker in exchange for $10,000,000 in U.S. securities. Investment Banker can do only one thing with the check: deposit it in its checking account at a commercial bank. The "money supply" of the country has already increased by $10,000,000; no one else's checking account has decreased at all. There has been a net increase of $10,000,000.

The commercial bank is delighted to get a check on the Fed, and rushes down to deposit it in its own checking account at the Fed, which now increases by $10,000,000. But this checking account constitutes the "reserves" of commercial banks, which have now increased across the nation by $10,000,000. This means that commercial banks can create deposits based on these reserves, and that, as checks and reserves seep out to other banks each one can add its own fractional-reserve move, until the banking system as a whole has increased its demand deposits by $100,000,000: ten times the original purchase of assets by the Fed. The banking system in most circumstances is required to keep cash reserves or cash equivalents at the Federal Reserve Bank amounting to 10 percent of customer deposits. The basis of this 10% reserve activity is called a "net transaction." There are to other lesser activities that require no reserve to be provided to the Federal Reserve Bank: "non-transactions and non-personal saving deposits." The banking system on a fractional-reserve basis on a net transactions designation has a "money multiplier"—the amount of deposits the banks can expand on top of reserves—which is 10. A purchase of assets of $10 million by the Fed has generated very quickly a tenfold, $100,000,000 increase in the money supply of the banking system as a whole.

It should be observed that banks are regulated (like Regulation D) in the manner in which protections are provided to prevent this leveraged system from collapsing. Yet, observably, banks today are highly competitive, seeking to increase their "captive" reserve in order to increase their fractional-reserve and ability to expand in the exponential process indicated above.

In order to permit expansion of the reserve at banks, banks are constantly seeking depositors, those who wish to have their money captive by a bank (as in, e.g., a CD) which permits the reserve to increase and the leverage (of about 10:1) to be employed upon this money.

The meeting between the approximately $33 billion of fractional metallic currency and the fractional-reserve banking system lies at the heart of the instant invention which provides a system, method and devices to achieve the goal of minimizing the use of fractional metallic currency as coinage, but rather keeping the same and transactions related thereto within the scope of a banking institution for use by both the depositor and the bank(s) in accordance with standard fractional-reserve banking, while permitting the depositor to avoid the inconvenience of the actual fractional currency without forfeiture of any of its value.

Other objects of the instant invention will be shown hereinbelow.

SUMMARY OF THE INVENTION

The various features of novelty which characterize the invention are pointed out with particularity in the claims annexed to and forming a part of the disclosure. For a better understanding of the invention, its operating advantages, and specific objects attained by its use, reference should be had to the drawings and descriptive matter in which there are illustrated and described preferred embodiments of the invention.

The foregoing objects and other objects of the invention are achieved through system, method and devices that enable the capture of fractional metallic currency values by a financial institution that can thereupon utilize the same as part of its fractional-reserve. In particular, under the preferred embodiment, there are two types of devices that are employed: a portable device and a node device. Both are intended, under this embodiment, to be linked to accounts within the same financial institution.

In particular, a portable device is employed herein. The portable device has a number of features, including security, a display, a microprocessor, memory, and the like. In this manner, the portable device is actually an interface to the account at the specific banking institution. (It should be appreciated by one of ordinary skill that the specific phrases "bank," "institution," "financial institution" and the like are utilized herein virtually synonymously for all such banking institutions that provide accounts and can take advantage of Regulation D and/or fractional-reserve banking.

The portable device is the equivalent of the piggy bank in the sense that it is a recordation and display device for fractional metallic currency, in this embodiment. The piggy bank is, instead of an animate object holding actually coinage, an account with the financial institution, devoted solely and captive therewith, in which the user has deposited currency for use of the device. In this regard, overcome is the necessity to have containers for change, as the use of the portable device is developed, as explained herein, there will be a steady decline to zero of the need for use of any coinage whatsoever, while the amounts of money per transaction of under the minimum paper value (a fraction of, e.g., a dollar) accumulate or decline as transactions occur.

The portable device has an encrypted interface with a node device. The node device, in distinction from the portable device, is actually linked to a point of sale device "POS" (whether an actual POS device or its equivalents, like a passive or active vending machine). The portable device is independently battery powered and is with a customer. On the other hand, the node device is generally considered to be with a vendor. Importantly, both devices through encryption interfaces connect with the banking institution. In this manner, it can be observed that the transaction(s) between the portable device and the node device remain within the constraints of but one banking institution, in this preferred embodiment. In this manner, while currency passes electronically for services or goods between the portable device and node device (customer and vendor, e.g.), the actual underlying money never leaves the banking institution.

Observably, as more transactions occur, the banking institution maintains, as captive, the total amount of money exchanged between the parties —it merely moves from one account to another. In this manner, the reserve for which fractional leverage can be had by the bank is increased, and its lending/borrowing power thereby increased as well. Since the preferred embodiment is intended to capture the fractional metallic currency market, conceptually, the bank is now garnering portions of the aforementioned approximately $33 billion in coinage in circulation an adding the same to its reserve —a situation heretofore unknown and practically impossible to achieve. Thus, whereas coinage has been a nuisance to a bank and typically invokes a charge for conversion, in this manner, coinage has now become a captive asset of the bank, and transactions involving the same are also beneficially added to the reserve of that bank.

Likewise, benefits enure to customers as well. Rather than have the nuisance and inconvenience of metallic currency, customers can utilize a "fob" styled (a "fob" is a small device attached to a short strap, ribbon or chain) simple portable device for all fractional exchanges, from purchases from active vendors, to passive vendors, POS devices and others. No longer must the customer keep coinage. Instead, coinage is converted, and added (at the bank if no consumer transaction is invoked) on an as needed basis. As a result of the design, the customer can view on the portable device the coinage balance, and the bank has the full record of each transaction as well reported by the portable device when engaged at the banking institution and via communications per transaction by the node device(s).

Observably, while the preferred embodiment is directed to coinage, it is within the letter, sprit and intent of this invention to permit the elimination of all forms of currency. However, the preferred embodiment seeks to capture a heretofore ubiquitous $33 billion coinage that has heretofore been but a nuisance, and transform the same to an asset captured by the reserve of a bank.

Further, it is a feature of the invention to permit inter-bank transactions, as may be desired in the future. As this may be cumbersome, the instant invention demonstrates utility specific to a single bank (but all of its branches and affiliates) to increase the reserve of that bank. Clearly, inter-bank exchanges can be affected as the case my be, without deviating from the spirit and scope of the claimed invention.

The portable device is activated by an optional security interface which may take the form of a number of different variations. Such security is important to the extent that the portable device may not be "hacked" or otherwise misappropriated and the amount of money in the account to which it is linked stolen. In this respect, it is a goal to employ a biometric interface (like a thumb scanner) to read the thumb print of the owner, compare it to that of the owner (pre stored) and thereupon permit use of the device. Other security features are also considered. The user can lock down the device by engaging a code through the interface, and unlock the same by engaging the same code. Other security interface mechanisms can be employed without deviating from the letter, scope and claims of the subject invention. Importantly, the security feature must balance user compliance issues with power constraints in order to achieve maximum efficacy.

The goal of the portable device is to engage a battery source (that is preferably rechargeable optionally by a solar panel) for daily operations without a "down" time. Thus, all hardware components and their relative draw-down on the battery are considered for optimal performance.

The portable device also contains an operator interface for entry of instructions (as in a push button and a wheel, a display for indicating the progress of security, the transaction, and balance reporting, memory for storing instructions and permitting changes based upon transactions, a processor with digital input/output ("I/O") support to process the pre-encoded algorithms and to regulate the operation of the hardeware, power management for controlling the power supply, a wireless communication interface (which includes a properly determined antenna) for proximate engagement with the bank and with a plurality of node devices, and an optional wired communication interface for a hardwired connection, if so desired.

In the preferred embodiment, wireless communication utilized the "Bluetooth®" standard encryption. Observably, any electromagnetic spectra frequency can be employed, as well as any standardized encryption algorithm provided both sides can "speak" effectively. It should be appreciated by one of ordinary skill in the art that while the present, preferred embodiment uses Bluetooth, any such communication system that provides substantially the same results can be employed without deviating from the scope, spirit and claims of the subject invention.

BlueTooth is a specification for the use of low-power radio communications to wirelessly link phones, computers and other network devices over short distances. The name "Bluetooth" is borrowed from Harald Bluetooth, a king in Denmark more than 1,000 years ago. Bluetooth technology was designed primarily to support simple wireless networking of personal consumer devices and peripherals, including cell phones, PDAs, and wireless headsets. In this manner it is currently an ideal communication method herein, but the invention is not limited thereto. Wireless signals transmitted with Bluetooth cover short distances, typically up to 30 feet (10 meters). Bluetooth devices generally communicate at less than 1 Mbps.

Bluetooth networks feature a dynamic topology called a piconet or PAN. Piconets contain a minimum of two and a maximum of eight Bluetooth peer devices. Devices communicate using protocols that are part of the Bluetooth Specification. The Bluetooth standard utilizes the same 2.4 Ghz range as 802.11b and 802.11g, typically used in WiFi systems.

The node device has components similar to those of the portable device, save for one preferred change. Since the node device is generally not portable, it has sustaining power supply via wall power, and its communications to the banking institution can be through normal telephone communications (whether twisted pair, voice over IP, Internet direct, or the like).

In operation of the method and system, agreements are executed between customers and vendors. Each are given, respectively, portable and node devices, and the communication system established. Each portable device is initiated by placing thereupon fractional metallic currency equivalents. In this respect, a bank can capture the actual metallic currency and "credit" the portable device therewith. The portable device, which is both a "credit" and "debit" device (herein considered a "cre-bit" device) then lists debits when transactions occur at designated nodes.

Nodes are widely dispersed, much like their predecessors of magnetic swiping machines. Thus, it is perceived that nodes will be in retail establishments, attached to POS devices, in vending machines both passive and active, and the like.

In this manner, it is a general feature of the instant invention to provide a system, method and devices for capturing a heretofore $33 billion fractional metallic currency market and adding the same to the fractional-reserve of at least one bank, while simultaneously eliminating the nuisances associated with transactions and bulk of fractional metallic currencies.

In summary, a system, method and apparatus are provided for increasing the asset base of a banking institution having a first and second account captive therein for fractional-reserve banking, having a portable device for encrypted containment of currency amounts linked to the first account at the banking institution and enabled to perform commercial transactions that affect the balance of the first account; a node device for encrypted containment of currency amounts linked to the second account at the banking institution and enabled to perform commercial transactions that affect the balance of the second account; an encrypted interface between the portable device and the node device for communication therebetween to accurately affect a commercial transaction between in which there is a credit to one and a debit to the other; such that by transacting a commercial transaction between the two devices one of the accounts is debited for the transaction a specific amount and the other account is credited the specific amount debited commensurate with the commercial transaction; and communication of the transaction to the banking institution such that the balances of each respective account are properly credited and debited in accordance with the commercial transaction.

The accounts and transactions are based on fractional currency, resembling but replacing metallic currency (coinage). In this manner, coinage is eliminated from the transaction in respect of the operators of the portable and node devices, and the entire transaction remains captive with the initiating bank. Observably, since the money remains captive, the reserve amount never changes despite the transactions, and hence the fractional-reserve leverage never changes. This is of obvious advantage to the initiating bank, as it can now capture heretofore uncapturable metallic currency and encroach upon, if not entirely subsume the multi-billion dollar metallic currency market, adding the same to its reserve for fractional-reserve banking.

In order to effect the same, the portable device comprises a microprocessor, display for displaying the balance and communications with an operator of the device, an operator interface for entering and receiving transaction related and balance related data, power, memory, and wireless communications for communicating with the banking institution and node device.

The portable device further has a security system for ensuring the accuracy of the transaction and operators of the respective portable and node devices.

Likewise, the node device comprises a microprocessor, display for displaying the balance and communications with an operator of the device, operator interface means for entering and receiving transaction related and balance related data, power, memory, and communication for communicating with the banking institution and portable device.

Preferably, the microprocessor of the portable device is an ARM Processor, the display means is an LCD display approximately one inch by one inch, the operator interface comprises a mouse-type button, LED and wheel, power is provided by a battery, memory comprises memory selected from the group consisting of SRAM, Flash, ROM and combinations thereof, and the communication is via a Bluetooth chip.

It should also be appreciated that biometrics can be included, as indicated hereinabove for added security upon determination of the power management issues associated therewith, without deviating from the spirit and claims of the subject invention.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein similar reference characters denote similar elements through the several views.

DETAILED DESCRIPTION OF THE PREFERRED EMBODIMENTS

Figure 1:
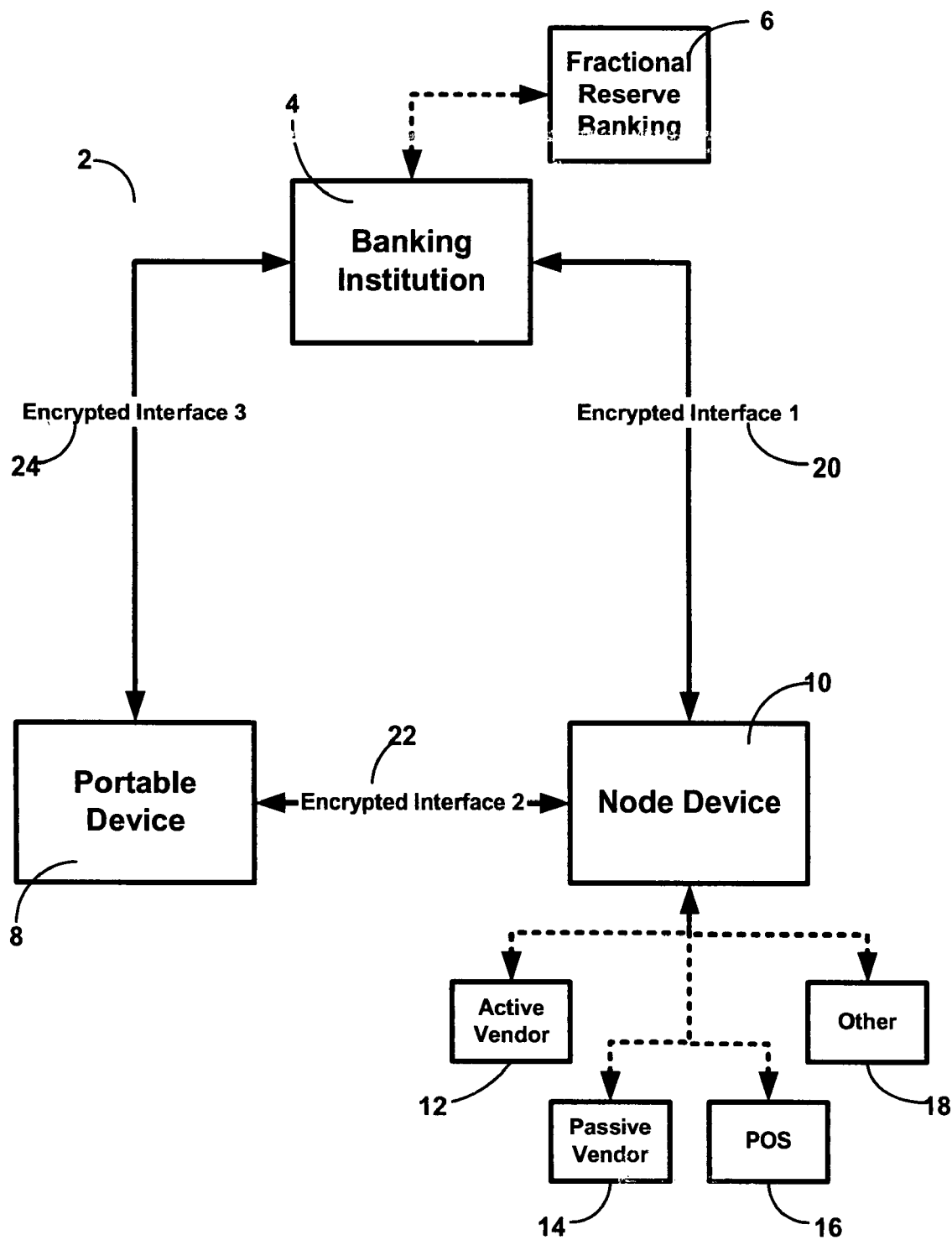
FIG. 1 is an overall diagrammatical view of the components that comprise the system, method and devices of the preferred embodiment of the instant invention.

In accordance with the subject invention, FIG. 1 shows the system and components 2, wherein banking institution 4 is seeking to capture some of the fractional currency in this preferred embodiment and to add the same to its asset base (reserve) for fractional-reserve banking 6. A first account associated with portable device 8 and a second account associated with node device 10 are resident in banking institution 4 for the purposes of enabling fractional currency-based transactions. Such accounts are established in advance of enabling the system and apparatus, and never leave the bank 4. Indeed, despite the fact that transactions occur between the two accounts, the underlying currency merely moves from one location to another, but remains intra-bank 4. In this manner, the actual asset base of the bank remains unchanged, while the currency moves between accounts. Thus, the fractional-reserve banking remains unchanged, despite the differences between account balances, as the asset base of the bank is not depleted with such transactions, thereby achieving a hereinbefore indicated objective and feature of the invention set forth.

Communication between node device 10 and banking institution 4 is determined based upon an encrypted interface 1 (item 20), and can be achieved through the Internet, telephone system, intranet or any other suitable means known to one of skill in the art. As with encrypted interface 1 (20), node device 10 communicates with portable device 8 through encrypted interface 2 (item 22), and portable device 8 via encrypted interface 3 (item 24) with banking institution 4. It should be appreciated that portable device 8 communicates in close proximity, utilizing a limited power output, to node device 10. In banking institution 4 is an additional receiver for engaging communications with portable device 8. With a limited dispersive angle transceiver mechanism in portable device 8 and low power output, limited power is used, and the device 8 must be proximate to the receiver for communications to occur, thereby enhancing privacy. As indicated, Bluetooth is a preferred encryption and communication modality, although other such modalities may be used provided the specifications are compatible with the underlying letter and spirit of the claimed invention.

Node device 10 takes the form of a multiplicity of transactional devices, including an active vendor 12, a passive vendor 14 (like a parking meter, as discussed), a POS device 16, or other 18. Each of these devices is enabled to communicate, with the account resident in the same banking institution 4 as portable device 8. Clearly, each person has a portable device 8 and an associated account with banking institution 4 to enable a multiplicity of transactions to occur via node device 10, without depleting the asset base of banking institution 4 while permitting financial transactions.

Figure 2:
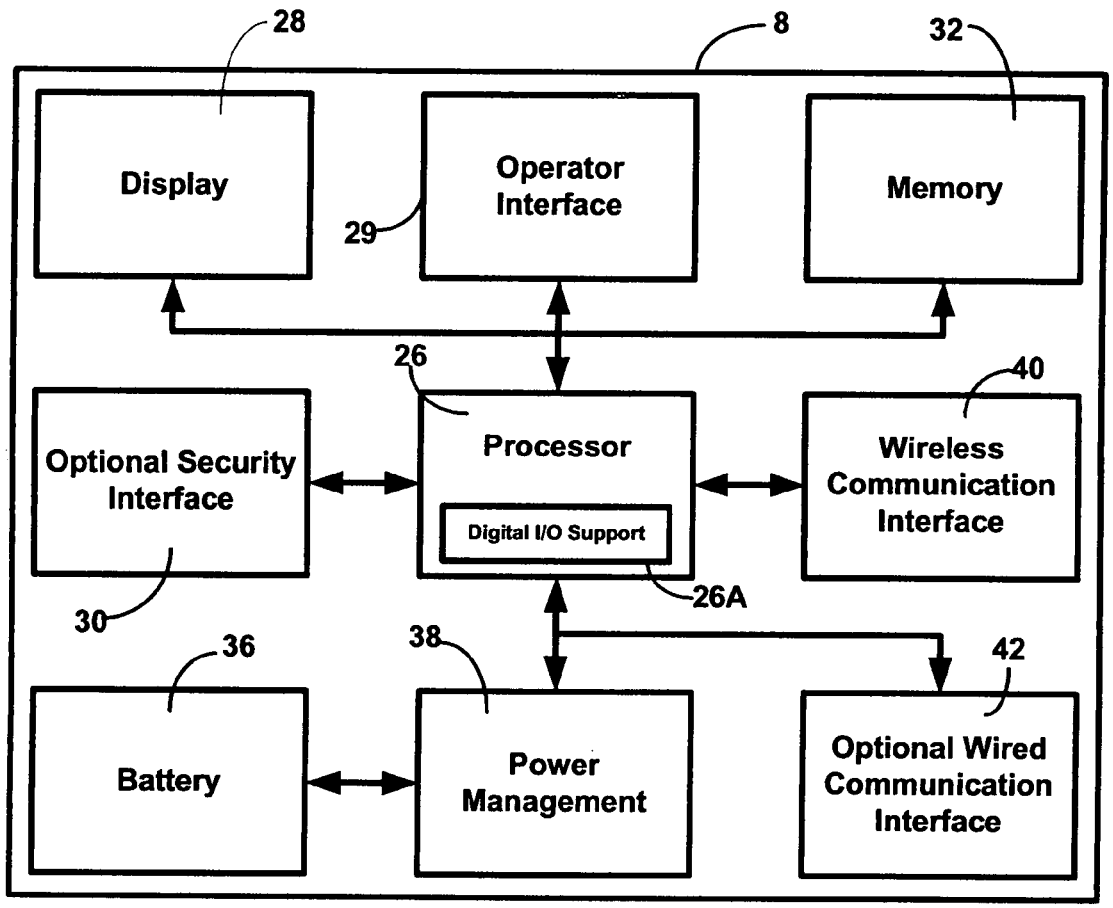
FIG. 2 is a block diagrammatical view of the components of the portable device in accordance with the preferred embodiment of the instant invention.

FIG. 2 shows a component design for portable device 8, in accordance with a preferred embodiment thereof. In particular, processor 26 is provided with digital input/output ("I/O") support 26A for interfacing with optional security interface 30 (like a biometric or other device), wireless communication interface 40 (for Bluetooth, for example), power management 38 for controlling power usage and supply, battery 36 and optional wired communication interface 42 (like an IEEE 1394, USB, or the like). On the other hand, processor 26 also engages display 28 for interfacing with the user, operator interface 29 (like a wheel, pushbuttons, keypad, and the like) and memory 32. In this manner portable device 8 is rendered fully operational.

Figure 3:
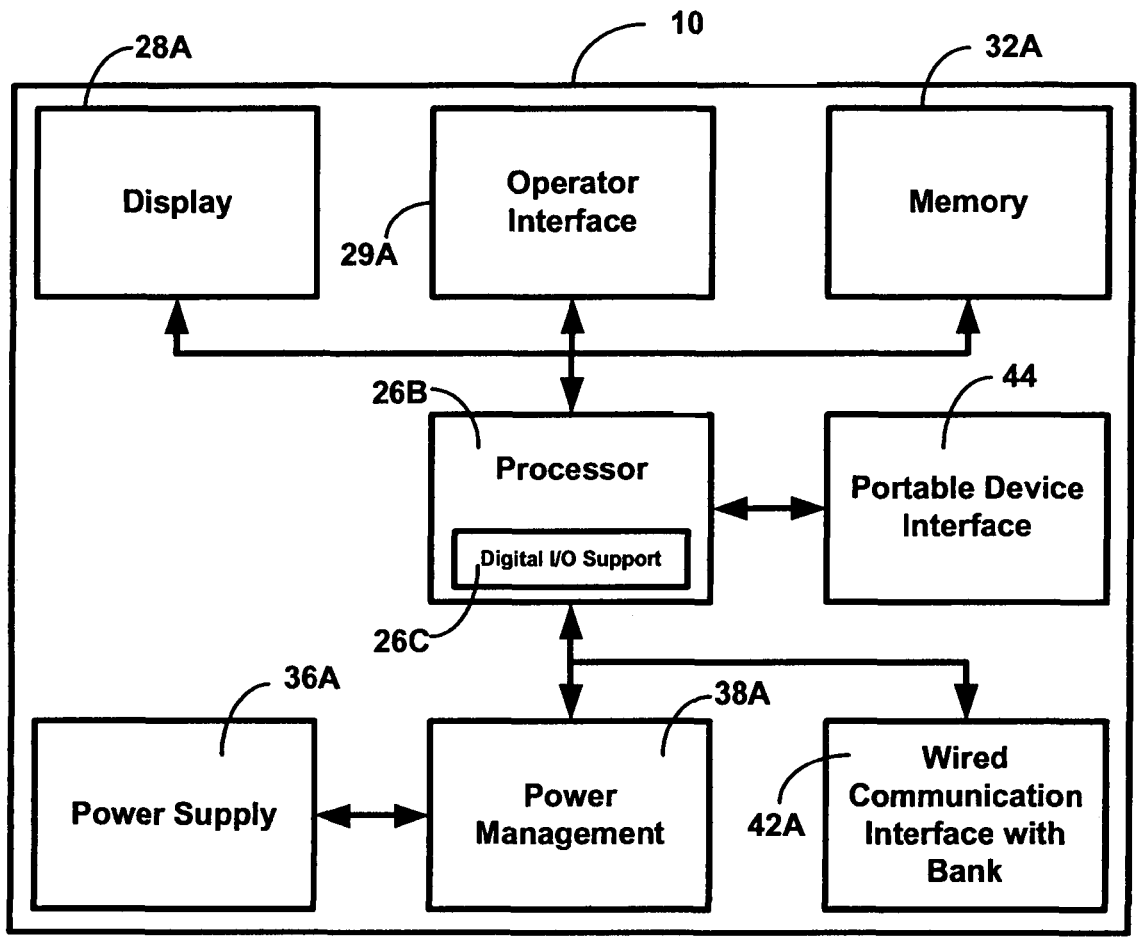
FIG. 3 is a block diagrammatical view of the node device in accordance with the preferred embodiment of the instant invention.

FIG. 2 shows a component design for node device 10, having similarly named components to that shown in FIG. 3. It should be appreciated that while the selection of individual components for portable device 8 require consideration of power consumption in order to enable a more efficient use of battery 36, in node device 10, it is assumed that power supply 36A is employed which can be wired to a 110 v wall current hence rendering power consumption of less concern. In FIG. 3, there is shown processor 26B, digital I/O support 26C, power management 38A, wired communication interface with bank 42A, and portable device interface 44, which, function in accordance with the indicated naming. Likewise, processor 26B engages display 28A for interface with the operator via operator interface 29A which can be a keyboard, and memory 32A. It should be appreciated that memory in portable device 8 as well as node device 10 renders the account and transactional information concomitant with that stored in banking institution 4 (FIG. 1). Preferably portable device 8 via operator interface 29 engages the display of current balance on display 28 at any given determined time.

Figure 4:
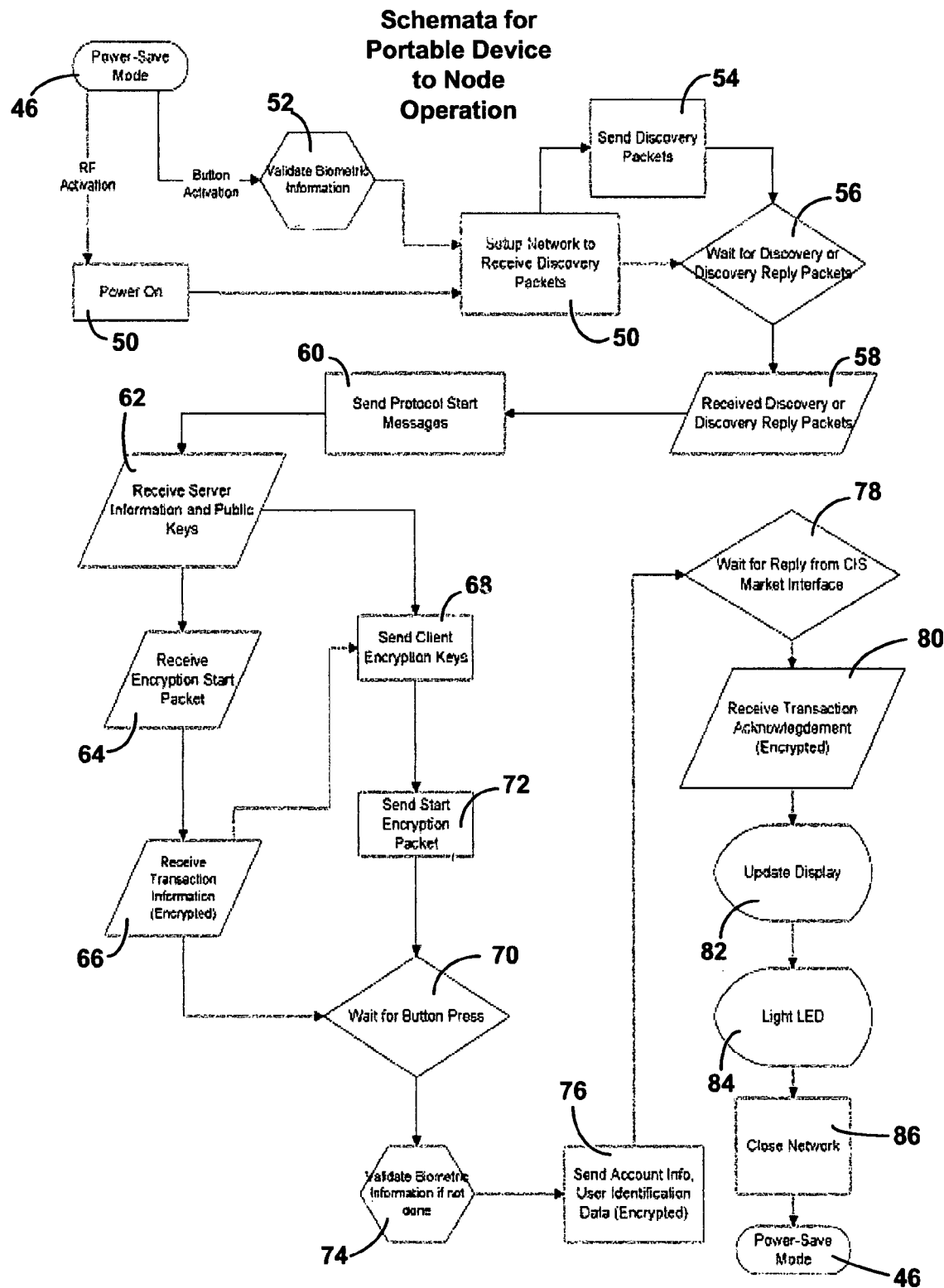
FIG. 4 is a flow chart schematical representation of the portable device operation with the node device, in accordance with a preferred embodiment of the subject invention.
Figure 5:
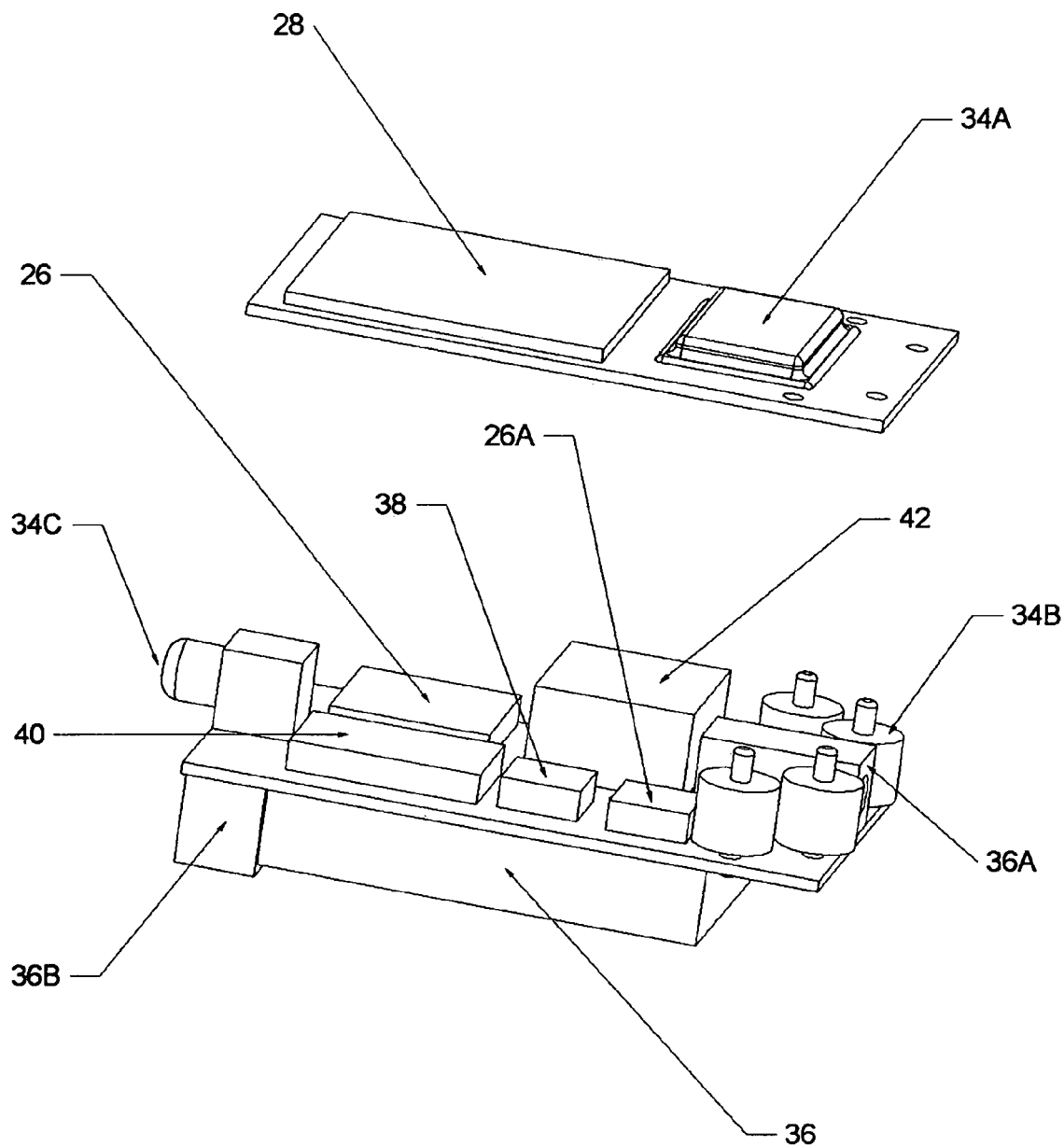
FIG. 5 is an exploded side view of the portable device showing specific components and layout in accordance with a preferred embodiment of the subject invention.
Figure 6:
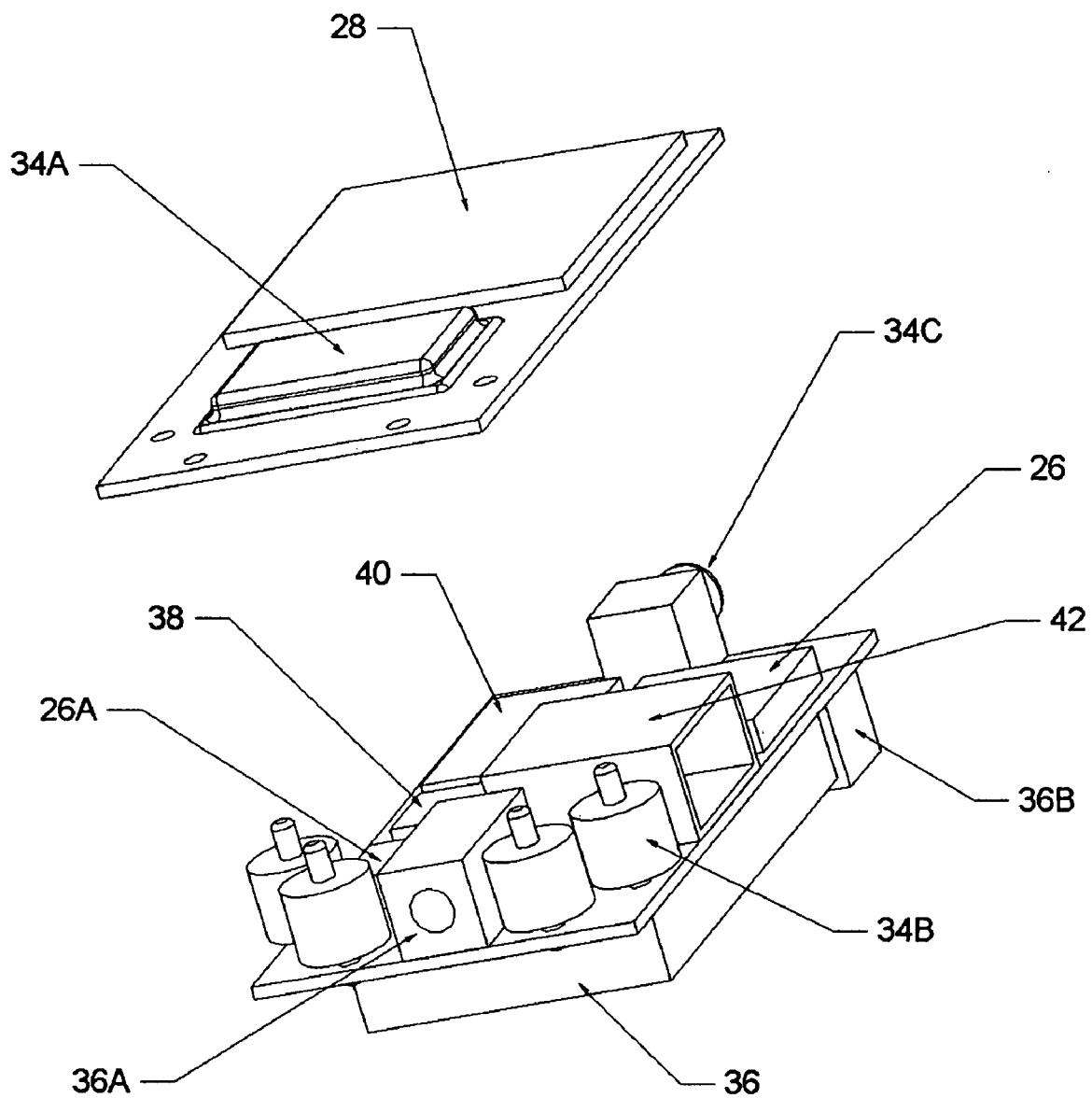
FIG. 6 is an exploded back view of the portable device showing specific components and layout in accordance with a preferred embodiment of the subject invention.
Figure 7:
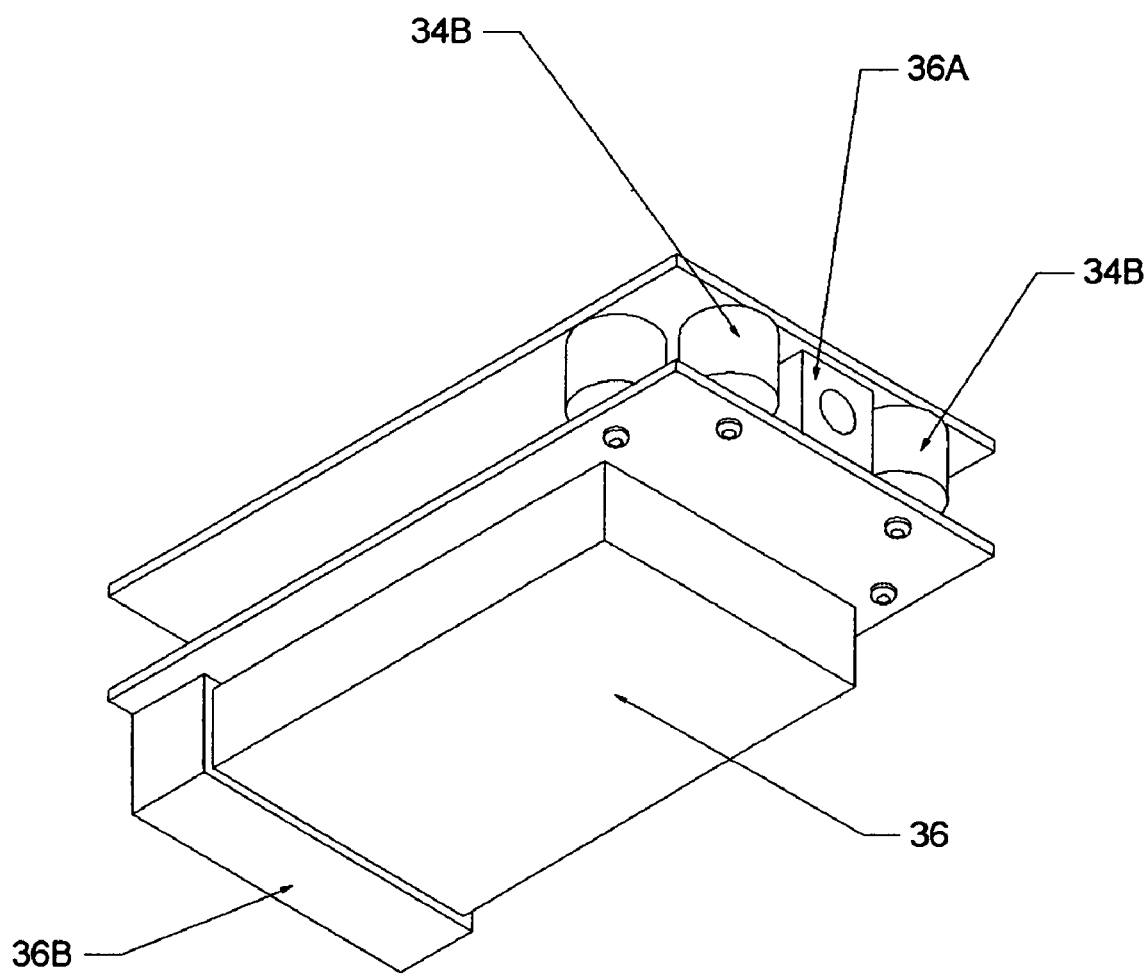
FIG. 7 is a perspective bottom view of the portable device in closed manner, in accordance with a preferred embodiment of the subject invention.
Figure 8:
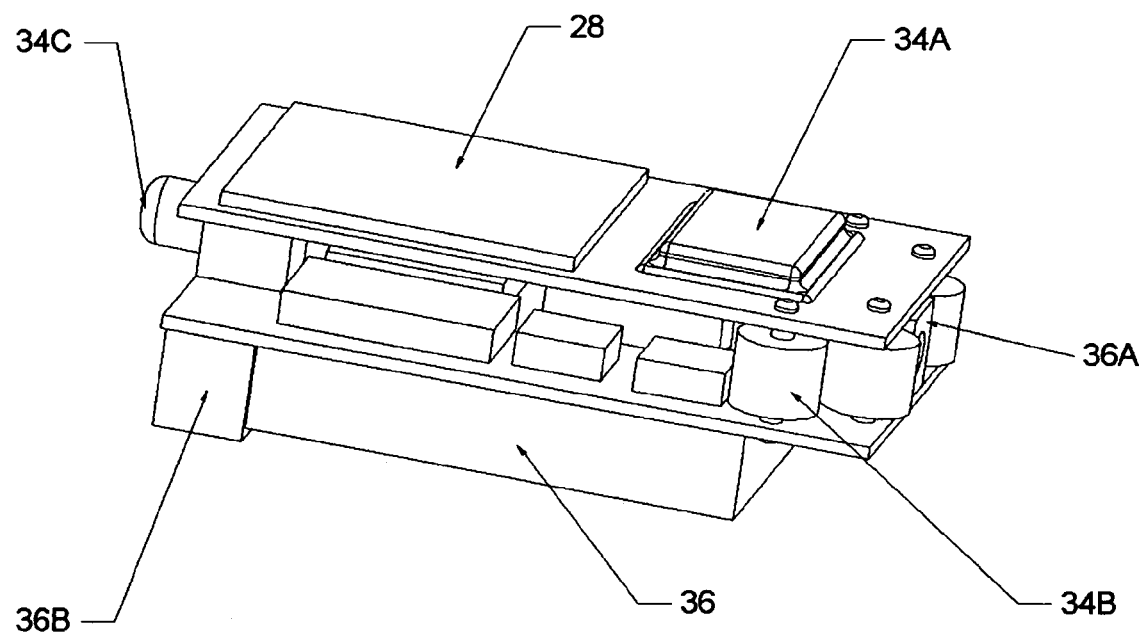
FIG. 8 is a perspective side view of the portable device view in closed manner, in accordance with a preferred embodiment of the subject invention.
Figure 9:
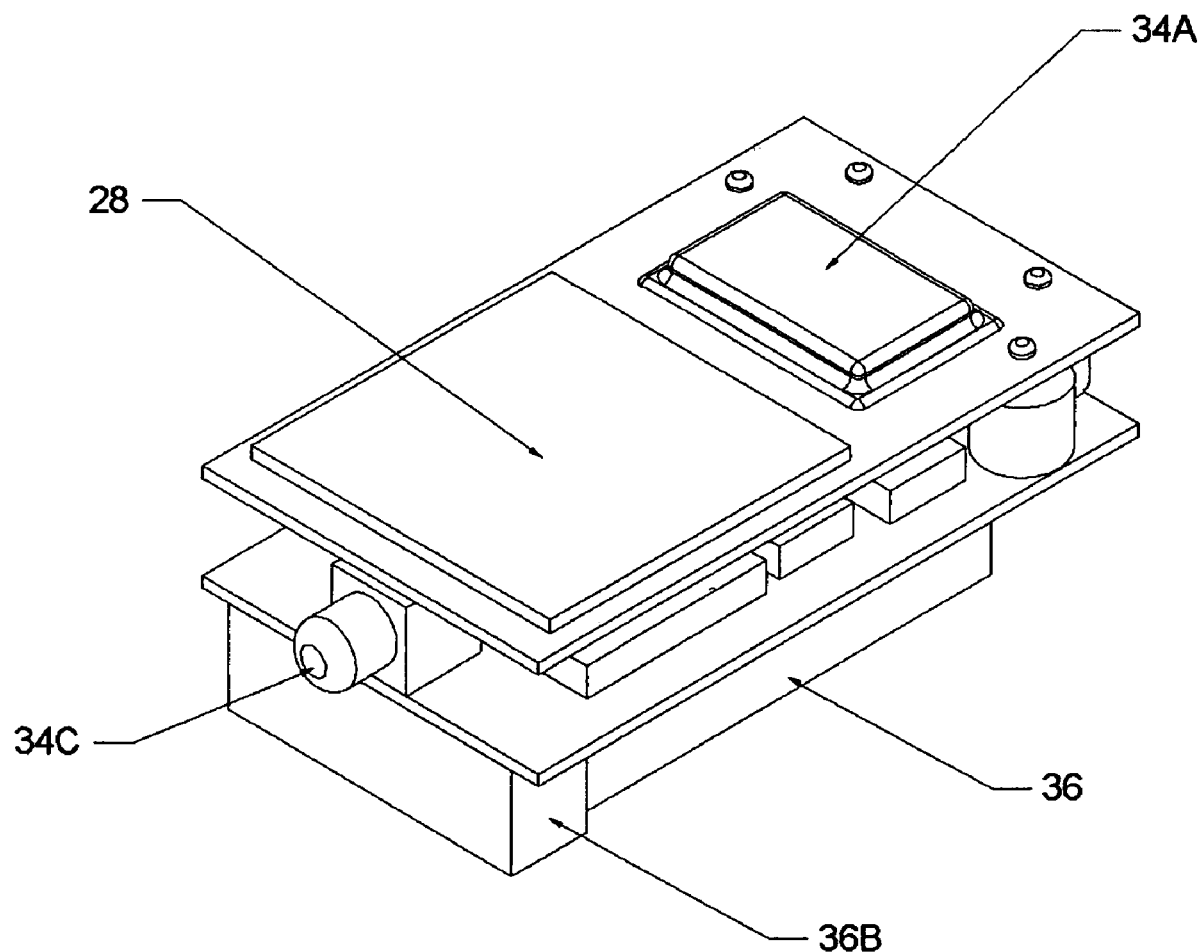
FIG. 9 is a perspective front view of the portable device in closed manner, in accordance with a preferred embodiment of the subject invention

FIG. 4 shows a flow chart (schemata) for the protocol of portable device 8 to node device 10. The flow commences with power-save mode 46 (and ends at the same point). If radio frequency activation occurs (as in automatic, close proximity to node device 10, thereby automatically engaging), power on occurs at step 50. Likewise, if button activation is selected at step 52 for portable device 8, validation of biometric information occurs at step 52. It should be appreciated that other forms of validation can be employed, including entry of a code. In either respect, once power is on, the network is established to receive discovery packets at step 50. Thereupon packets are sent at step 54, reply packets are awaited at step 56, received at step 58, and protocol start messages are sent at step 60. Server information and public keys are thereupon received at step 62, with a reception of encryption start packet at step 64, and reception of transaction information in encrypted form at step 66. Client encryption keys are engaged at step 68, encryption package sent started at step 72, and a waiting for button step occurs at step 79. At this point, validation occurs at step 74 (if not theretofore), account information, user identification and data, in encrypted form, are sent at step 76, reply is awaited at step 78, transaction acknowledgment received at step 80, display is updated with the transaction results at step 82, and LED is lit at 84 indicating a completed transaction at step 84, the network is closed at step 86, and the device return to power-save mode at step 46.

FIGS. 5, 6, 7, 8 and 9 show exploded perspective views of portable device 8 with the components laid thereupon, conforming with the numbers indicated above. In this preferred embodiment, 26 is a processor with memory, 40 a Bluetooth chip, 38 a power management chip, 26A a digital I/O chip, 28 a display (in this instance LCD), 34A a button (mouse-type), 34C an LED, 42 a USB interface, 34 B a thumbwheel, 36A power inlet for charging the battery, 36B a battery connector, and 36 a battery.

While there have been shown, described and pointed out fundamental novel features of the invention as applied to preferred embodiments thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

We claim:

1. A system for increasing the demand deposit asset base of a banking institution for fractional-reserve banking within the Federal Reserve System, wherein a first and a second demand deposit account, each having a balance, are captive in that banking institution, comprising:

(a) a portable "cre-bit" device for encrypted containment of numeric fractional currency amounts linked to the first account at the banking institution and comprising portable transacting means for validating and performing at least one commercial transaction without the use of physical fractional currency and for a specific amount, (b) a node device for encrypted containment of numeric fractional currency amounts linked to the second account at the banking institution and comprising node transacting means for validating and performing said at least one commercial transaction without the use of physical fractional currency and for said specific amount, (c) an encrypted data exchange interface between said portable device and said node device for accurately communicating therebetween said specific amount of said at least one commercial transaction that comprises "cre-bit" data: a credit to one and a debit to the other;

(d) upon transacting said at least one commercial transaction the two devices are configured via said respective transacting means to trigger said data exchange interface such that said "cre-bit" data is communicated between said two devices in order for one of the accounts to be debited for said transaction said specific amount and the other device to be credited said specific amount commensurate with said at least one commercial transaction;

(e) first communication means for communicating said "cre-bit" data to the banking institution to effect said crediting and debiting of said accounts such that the balance of each respective account therein is respectively properly credited and debited said specific amount in accordance with said at least one commercial transaction;

(f) second communication means for communicating within the Federal Reserve System changes in the demand deposit asset base at the banking institution for fractional-reserve banking within the Federal Reserve System; and (g) said portable "cre-bit" device comprises a microprocessor, display means for displaying said balance of said first account and "cre-bit" data, operator interface means for entering, sending and receiving said "cre-bit" data, power, memory, and wireless communication means for communicating with said node device.

2. The system of claim 1, wherein said at least one commercial transaction comprises fractional currency.

3. The system of claim 1, wherein the balance in at least one of said demand deposit accounts is increased by the value representing and corresponding to units of physical currency collected prior to said at least one commercial transaction.

4. The system of claim 1, wherein said portable device further comprises security means for validating the transaction and interoperability of the respective portable and node devices.

5. The system of claim 1, wherein said node device comprises a microprocessor, display means for displaying said balance of said second account and "cre-bit" data, operator interface means for entering, sending and receiving said transaction related and balance related data, power, memory, and communication means for communicating with the banking institution and said portable device.

6. A method for increasing the demand deposit asset base of a banking institution for fractional-reserve banking within the Federal Reserve System, wherein a first and a second demand deposit account, each having a balance, are captive in that banking institution, comprising:
   (a) receiving physical fractional currency at the banking institution and increasing the balance of said first deposit account in an amount corresponding to the value of the currency received;
   (b) encrypting in a portable "cre-bit" device the balance of said first account including the numeric value of the currency amounts received;
   (c) reflecting in a node device currency amounts concomitantly linked to the second accountant at the banking institution:
   (d) performing at least one commercial transaction without the use of physical fractional currency and for a specific amount in a manner that provides that the first account is simultaneously debited said specific amount and the second account is credited that amount in accordance with said at least one commercial transaction, comprising the steps of:
      (1) communicating in an encrypted manner between said portable device and said node device accurate "cre-bit" data reflecting the commercial transaction that comprises a credit to one and a debit to the other in the specific amount:
      (2) transacting the commercial transaction between the two devices such that said currency amount encrypted in said portable device is debited for the transaction said specific amount and said currency amount reflected in said node device is credited said specific amount commensurate with the commercial transaction and in accordance with said "cre-bit" data; and
      (3) communicating said "cre-bit" data to the banking institution;
      (4) adjusting the balances of each respective account at the banking institution by simultaneously crediting and debiting the respective account in accordance with the commercial transaction and said "cre-bit" data; and
      (5) concomitantly updating the respective currency amounts to equal the respective adjusted balances;
   (e) repeating at least one step selected from the group consisting of: (1) step (a) then step (b); and (2) step (c); and
   (f) displaying on demand upon said "cre-bit" device said balance in said first account and "cre-bit" data.

7. The method of claim 6, wherein said at least one-commercial transaction comprises fractional currency.

8. The method of claim 1, wherein at least one of the captive accounts comprises fractional currency.

9. An apparatus for increasing the demand deposit asset base of a banking institution for fractional-reserve banking within the Federal Reserve System, wherein a first and a second demand deposit account, each with a respective balance, are captive, comprising:
   (a) portable means for encryption and display of a fractional currency amount linked to the first account at the banking institution and comprising transacting means for performing and validating at least one commercial transaction affecting the balance of the first account;
   (b) node means for encryption and display of a fractional currency amount linked to the second account at the banking institution and comprising node transacting means for performing and validating said at least one commercial transaction affecting the balance of the second account;
   (c) encrypted interface means between said portable device means and said node device means for communicating between said transacting means data reflecting said at least one commercial transaction comprising a credit to one account and a debit to the other account for a specific amount that includes fractional currency ("cre-bit" data);
   (d) transmitting means for transmitting said "cre-bit" data between the portable and node means such that the balance of one account is debited for the transaction said specific amount and the other account is credited said specific amount commensurate with said at least one commercial transaction;
   (e) approving means, operatively contained in said portable means, which, when approvingly engaged, encryptically transmits to and receives from said node means said "cre-bit" data; and
   (f) first communicating means for communicating said "cre-bit" data to the banking institution;
   (g) bank transacting means for adjusting the balances of each respective account in accordance with the commercial transaction, specific amount and "cre-bit" data;
   (h) second communication means for communicating within the Federal Reserve System changes in the demand deposit asset base at the banking institution for fractional-reserve banking within the Federal Reserve System; and
   (i) display means for optional confirmatory display of currency amounts at the respective node and portable means.

10. The apparatus of claim 9, wherein said at least one commercial transaction comprises fractional currency.

11. The apparatus of claim 9, wherein the balance of at least one of the accounts comprises fractional currency.

12. The apparatus of claim 9, wherein the portable means comprises a microprocessor, display means for display of the balance of said first account, operator interface means for entering and receiving transaction related and balance related data, power, memory, and wireless communication means for communicating with the node means.

13. The apparatus of claim 9, wherein said portable means further comprises security means for ensuring security via operator identification and transaction validation for the respective portable and node means.

14. The apparatus of claim 13, wherein said microprocessor is an ARM Processor, said display means is an LCD display approximately one inch by one inch, said operator interface means comprises a mouse-type button, LED and wheel, power is provided by a battery, memory comprises memory selected from the group consisting of SRAM, Flash, ROM and combinations thereof, and said communication means comprises a Bluetooth chip and accompanying antenna.

15. The apparatus of claim 9, wherein the node means comprises a microprocessor, display means for displaying the balance of said second account, communication means for communicating with operators of the device, operator interface means for entering and receiving transaction related and balance related data, power, memory, and communication means for communicating with the banking institution and portable means.

* * * * *